United States Patent
Kim et al.

(10) Patent No.: US 9,055,602 B2
(45) Date of Patent: Jun. 9, 2015

(54) METHOD FOR ESTIMATING CHANNEL BASED ON IEEE 802.11AD WITH LOW COMPLEXITY

(71) Applicant: UNIVERSITY-INDUSTRY COOPERATION GROUP OF KYUNG-HEE UNIVERSITY ET AL, Yongin-si, Gyeonggi-do (KR)

(72) Inventors: JinSang Kim, Yongin-si (KR); KyuHoon Lee, Hwaseong-si (KR); IkJoon Chang, Seoul (KR)

(73) Assignee: UNIVERSITY-INDUSTRY COOPERATION GROUP OF KYUNG-HEE UNIVERSITY ET AL, Yongin-Si, Gyeonggi-Do (KR)

( * ) Notice: Subject to any disclaimer, the term of this patent is extended or adjusted under 35 U.S.C. 154(b) by 0 days.

(21) Appl. No.: 14/056,593

(22) Filed: Oct. 17, 2013

(65) Prior Publication Data
US 2014/0369213 A1     Dec. 18, 2014

(30) Foreign Application Priority Data
Jun. 18, 2013    (KR) .......................... 10-2013-0069708

(51) Int. Cl.
| | |
|---|---|
| *H04L 1/00* | (2006.01) |
| *H04L 12/26* | (2006.01) |
| *G01R 31/08* | (2006.01) |
| *H04W 72/08* | (2009.01) |
| *H04W 24/10* | (2009.01) |

(52) U.S. Cl.
CPC ............ *H04W 72/085* (2013.01); *H04W 24/10* (2013.01)

(58) Field of Classification Search
CPC ............ H04L 25/0212; H04L 25/0222; H04L 25/022; H04L 25/0236; H04L 25/0202; H04L 27/2675; H04L 27/2695; H04B 7/0626; H04B 17/0092; H04B 1/709; H04J 13/0014; H04W 24/10; H04W 72/085
USPC .................................. 455/504, 506; 370/252
See application file for complete search history.

(56) References Cited

U.S. PATENT DOCUMENTS

| | | | | |
|---|---|---|---|---|
| 8,774,146 | B2 * | 7/2014 | Ashikhmin et al. .......... | 370/338 |
| 2009/0285241 | A1 | 11/2009 | Zhang et al. | |
| 2010/0128762 | A1 | 5/2010 | Nabetani et al. | |
| 2013/0163761 | A1 * | 6/2013 | Baras et al. .................... | 380/270 |
| 2013/0235908 | A1 * | 9/2013 | Zhang et al. .................. | 375/146 |

OTHER PUBLICATIONS

"Wireless LAN at 60GHz—IEEE 802.11ad Explained," Agilent Technologies, May 30, 2013.*

* cited by examiner

*Primary Examiner* — Alpus H Hsu
*Assistant Examiner* — Elton Williams
(74) *Attorney, Agent, or Firm* — Lowe Hauptman & Ham, LLP

(57) ABSTRACT

Exemplary embodiments of the present invention relate to a method of estimating a channel in a wireless communication network using the IEEE 802.11ad communication standard, and more particularly, to a method of estimating a channel which can determine a channel environment and actively select a channel estimation scheme according to the determined channel environment, and correctly estimate the channel while reducing the amount of computation by selectively using a pilot channel estimation value only in a pilot estimation period and adjacent pilot estimation periods when the channel changes severely, i.e., when a deep hole occurs, in the pilot estimation period although an LTF channel estimation value is used.

22 Claims, 11 Drawing Sheets

FIG 5

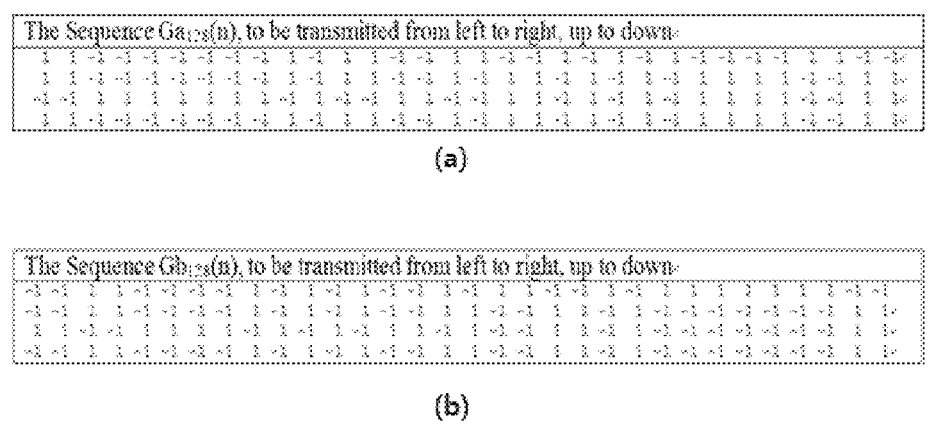

(a) The Sequence Ga₁₂₈(n), to be transmitted from left to right, up to down (b) The Sequence Gb₁₂₈(n), to be transmitted from left to right, up to down

FIG 9

| H_LTE | H_LTE[0] | H_LTE[1] | H_LTE[2] | H_LTE[3] | H_LTE[4] | H_LTE[5] | H_LTE[6] | H_LTE[7] | H_LTE[8] |
|---|---|---|---|---|---|---|---|---|---|
| H_P |  | H_P[0] |  | H_P[1] |  | H_P[2] |  | H_P[3] |  |
| H_LTE/ H_P |  | H_LTE[1] /H_P[0] |  | H_LTE[3] /H_P[1] |  | H_LTE[5] /H_P[2] |  | H_LTE[7] /H_P[3] |  |
| H_Proposal | H_LTE[0] | H_P[0] | H_interp | H_P[1] | H_interp | H_P[2] | H_LTE[6] | H_LTE[7] | H_LTE[8] |

METHOD FOR ESTIMATING CHANNEL BASED ON IEEE 802.11AD WITH LOW COMPLEXITY

CROSS-REFERENCE TO RELATED APPLICATIONS

This application claims the benefit of Korean Patent Application No. 10-2013-0069708, filed on Jun. 18, 2013 in the Korean Intellectual Property Office, which is incorporated herein by reference in its entirety.

BACKGROUND OF THE INVENTION

1. Field of the Invention

Exemplary embodiments of the present invention relate to a method of estimating a channel in a wireless communication network using the IEEE 802.11ad communication standard, and more particularly, to a method of estimating a channel, which can determine a channel environment and actively select a channel estimation scheme according to the determined channel environment, and correctly estimate the channel while reducing the amount of computation by selectively using a pilot channel estimation value only in a pilot estimation period and adjacent pilot estimation periods when the channel changes severely, i.e., when a deep hole occurs, in the pilot estimation period although an LTF channel estimation value is used.

2. Description of Related Art

With the advancement in smart devices such as a smart phone, a tablet computer and the like, the modern society enters into a highly information-oriented society. Accordingly, techniques for transmitting various types of digital information to a desired user in a speedy way are required. As digital image media techniques are advanced and the demand on high-speed wireless transmission are increased, a lot of studies on giga-bit level wireless transmission are in progress both domestically and internationally, and the most spotlighted technique among these is the IEEE 802.11ad communication standard which uses a frequency band of 60 GHz. The reason for this is that the IEEE 802.11ad communication standard can utilize a broad bandwidth of 7 GHz (between 57 GHz and 64 GHz in Korea) although this band is an industrial scientific medical (ISM) band.

However, since the 60 GHz band has a severe signal attenuation in a standby state, it recently attracts attention as a frequency band appropriate for a short range wireless network of a range of less than 10 meters. Although there are presently short range communication methods such as Bluetooth and the like, they cannot transmit a high-volume data such as a multimedia data due to the narrow bandwidth. Contrarily, the IEEE 802.11ad communication standard using a 60 GHz band enables multimedia communication of high-volume data in the field of short range data transmission.

In a wireless communication system, a lot of distortions occur in the size and phase of a data due to multiple paths of a channel. Particularly, the IEEE 802.11ad communication standard invites severe inter-symbol interference (ISI) since it uses a broad bandwidth of 7 GHZ. Accordingly, an Orthogonal Frequency Division Multiplex (OFDM) scheme is used to remove the ISI to the maximum. The OFDM is a method of dividing a broadband signal into a plurality of sub-carriers orthogonal to each other and transmitting the sub-carriers in parallel, and it has an effect of changing the characteristics of a frequency selective fading channel to the characteristics of a flat fading channel. Accordingly, the effect of the ISI can be greatly reduced.

However, although the OFDM is used, a lot of distortions occur in the size and phase of a data in the channel environment of IEEE 802.11ad communication standard. Therefore, the original signal is restored by compensating the size and phase of a distorted signal, and this process is referred to as equalization. In addition, changes in the size and phase of the signal are required to be estimated for the purpose of the equalization, and this process is referred to as channel estimation.

The channel estimation method of the OFDM is largely divided into a long training field (LTF)-based channel estimation method using training sequences and a pilot-based channel estimation method using pilot sub-carriers. Although the LTF-based channel estimation method is advantageous in that a channel can be estimated with a small amount of computation, accuracy of the channel estimation is low, whereas although the pilot-base channel estimation has a large amount of computation, accuracy of the channel estimation is excellent. Therefore, the LTF-based channel estimation method is appropriate for be used in a slow fading channel environment in which the channel changes infrequently, whereas the pilot-based channel estimation method is appropriate for be used in a fast fading channel environment in which the channel changes frequently. However, a channel estimation method in wireless communication network of the IEEE 802.11ad communication standard cannot use a fixed specific channel environment in view of the characteristics of a high-speed channel environment using a broad bandwidth in performing a short-range wireless communication.

SUMMARY OF THE INVENTION

Accordingly, the present invention has been made to solve the above-mentioned problems involved in a fixed channel estimation method in a wireless communication network of the IEEE 802.11ad communication standard as described above, and it is an object of the present invention to provide, and an object of the present invention is to provide a method of estimating a channel by actively selecting a channel estimation scheme according to a channel environment.

A channel environment is determined according to a correlation coefficient representing the similarity between an LTF channel estimation value of a received packet and an ideal LTF channel estimation value free of noise in a wireless communication network conforming to the IEEE 802.11ad communication standard, and a channel estimation scheme appropriate for the determined channel environment was experimentally confirmed, and thus another object of the present invention is to provide a method of estimating a channel by applying the channel estimation scheme appropriate for the channel environment determined based on a result of the experiment.

Still another object of the present invention is to provide a method of correctly estimating a channel with a small amount of computation by selectively applying a pilot channel estimation scheme even in a slow fading channel environment.

To accomplish the above objects, in one aspect, the present invention provides a method of estimating a channel in a wireless communication network, including the steps of: calculating a correlation coefficient representing a similarity between a long training field (LTF) channel estimation value calculated based on an LTF data stored in a preamble of a received packet and an ideal LTF channel estimation value free from noise; comparing the correlation coefficient with a first channel determination value and determining either a slow fading channel environment or a fast fading channel environment as a channel environment based on a result of the comparison; and estimating the channel according to the determined channel environment.

Here, the wireless communication network may conform to Institute of Electrical and Electronics Engineers (IEEE) 802.11ad communication standard.

More specifically, the step of calculating a correlation coefficient may include the steps of: extracting a first Golay sequence and a second Golay sequence from the long training field stored in the preamble of the received packet; performing autocorrelation functions of the first Golay sequence and the second Golay sequence; calculating the LTF channel estimation value from a sum of the autocorrelation function of the first Golay sequence and the autocorrelation function of the second Golay sequence; and calculating the correlation coefficient representing the similarity between the LTF channel estimation value and the ideal LTF channel estimation value free from noise.

Preferably, when the channel environment is determined as a slow fading channel environment, the channel estimation method may estimate the channel using the LTF channel estimation value, and when the channel environment is determined as a fast fading channel environment, the channel estimation method may estimate the channel using a pilot channel estimation value.

In accordance with an exemplary embodiment of the present invention, more preferably, the wireless channel estimation method may further include the steps of: determining, when the channel environment is determined as a slow fading channel environment, whether or not the correlation coefficient belongs to a range larger than the first channel determination value and smaller than the second channel determination value; calculating, when the correlation coefficient belongs to a range larger than the first channel determination value and smaller than the second channel determination value, a determination ratio between the LTF channel estimation value and the pilot channel estimation value in a pilot estimation period; determining whether or not the determination ratio exists within a critical range; and estimating, when the determination ratio does not exist within the critical range, the channel using pilot channel estimation values and pilot interpolation estimation values of the pilot estimation period and adjacent pilot estimation periods adjacent to the pilot estimation period.

Here, the pilot channel estimation value of the pilot estimation period and the pilot channel estimation values of the adjacent pilot estimation periods may be assigned as channel estimation values, and the pilot interpolation estimation values created by interpolating the pilot channel estimation value of the pilot estimation period and the pilot channel estimation values of the adjacent pilot estimation periods may be assigned as channel estimation values between the pilot estimation period and the adjacent pilot estimation periods.

On the other hand, when the determination ratio exists within the critical range, the channel may be estimated using the LTF channel estimation value.

Here, the correlation coefficient (r) may be calculated using the following Equation:

$$r = \frac{\sum_{i=1}^{n}(x_i - m_x)(y_i - m_y)}{\left|\sum_{i=1}^{n}(x_i - m_x)\right|\left|\sum_{i=1}^{n}(y_i - m_y)\right|}$$ [Equation]

wherein $x_i$ denotes an $i^{th}$ channel impulse response among the calculated LTF channel estimation values, $m_x$ denotes an average value of all the channel impulse responses constituting the calculated LTF channel estimation values, $y_i$ denotes an $i^{th}$ channel impulse response among the ideal LTF channel estimation values, $m_y$ denotes an average value of all the channel impulse responses constituting the ideal LTF channel estimation values, and n denotes the number of channel impulse responses constituting the calculated LTF channel estimation values and the ideal LTF channel estimation values.

Preferably, the first channel determination value is 0.8, and the second channel determination value is 0.95.

In another aspect, the present invention provides a method of estimating a channel in a wireless communication network, including the steps of: calculating a correlation coefficient representing a similarity between a long training field (LTF) channel estimation value estimated based on an LTF data stored in a preamble of a received packet and an ideal LTF channel estimation value free from noise; determining a range of the correlation coefficient existing with respect to a first channel determination value and a second channel determination value by comparing the correlation coefficient with the first channel determination value and the second channel determination value; and selecting a channel estimation scheme used for channel estimation based on the range in which the correlation coefficient exists.

Preferably, when the correlation coefficient is smaller than the first channel determination value, the channel may be estimated using a pilot channel estimation value, and when the correlation coefficient is larger than the second channel determination value, the channel may be estimated using the LTF channel estimation value.

Preferably, the method of estimating a channel in a wireless communication network may further include the steps of: calculating, when the correlation coefficient belongs to a range larger than the first channel determination value and smaller than the second channel determination value, a determination ratio between the LTF channel estimation value and the pilot channel estimation value in a pilot estimation period; determining whether or not the determination ratio exists within a critical range; and estimating, when the determination ratio does not exist within the critical range, the channel using pilot channel estimation values and pilot interpolation estimation values of the pilot estimation period and adjacent pilot estimation periods adjacent to the pilot estimation period.

Meanwhile, in still another aspect, the present invention provides an apparatus for estimating a channel in a wireless data communication network, including: an LTF channel estimation value calculation unit for calculating a long training field (LTF) channel estimation value estimated based on an LTF data stored in a preamble of a received packet; a correlation coefficient calculation unit for calculating a correlation coefficient representing a similarity between the LTF channel estimation value and an ideal LTF channel estimation value free from noise; a comparison unit for determining a range of the correlation coefficient existing with respect to a first channel determination value and a second channel determination value by comparing the correlation coefficient with the first channel determination value and the second channel determination value; a selection unit for selecting a channel estimation value used for channel estimation based on the range in which the correlation coefficient exists; and a channel estimation unit for performing channel estimation according to the selected channel estimation value.

Here, the LTF channel estimation value calculation unit may calculate the LTF channel estimation value from a sum of autocorrelation functions of a first Golay sequence and a second Golay sequence stored in the preamble of the received packet.

Here, the channel estimation apparatus in accordance with the present invention may further include an additional selection unit for secondarily selecting a channel estimation scheme based on a determination ratio between the LTF channel estimation value and a pilot channel estimation value in a pilot estimation period if the correlation coefficient belongs to a range larger than the first channel determination value and smaller than the second channel determination value.

Preferably, the additional selection unit may include: a ratio calculation unit for calculating the determination ratio between the LTF channel estimation value and the pilot channel estimation value in the pilot estimation period; a second comparison unit for determining whether or not the determination ratio exists within a critical range by comparing the determination ratio with the critical range; an interpolation unit for calculating pilot interpolation estimation values from pilot channel estimation values of the pilot estimation period and adjacent pilot estimation periods adjacent to the pilot estimation period, when the determination ratio does not exist within the critical range; and a second selection unit for selecting the pilot channel estimation value of the pilot estimation period, the pilot channel estimation values of the adjacent pilot estimation periods adjacent to the pilot estimation period, and the interpolation estimation values as channel estimation values.

BRIEF DESCRIPTION OF THE DRAWINGS

The above and other objects, features and advantages of the present invention will be apparent from the following detailed description of the preferred exemplary embodiments of the invention in conjunction with the accompanying drawings, in which:

FIG. 5 is a view showing a first Golay sequence $G_a$ and a second Golay sequence $G_b$ of a long training field stored in the preamble of a packet;

FIG. 9 is a view showing an example for explaining a method of selecting a channel estimation value when a determination ratio does not exist within a critical range in a channel estimation method in accordance with the present invention;

DESCRIPTION OF THE PREFERRED EMBODIMENTS

A channel estimation method and an apparatus thereof in accordance with the present invention will be described below in more detail with reference to the accompanying drawings.

Figure 1:
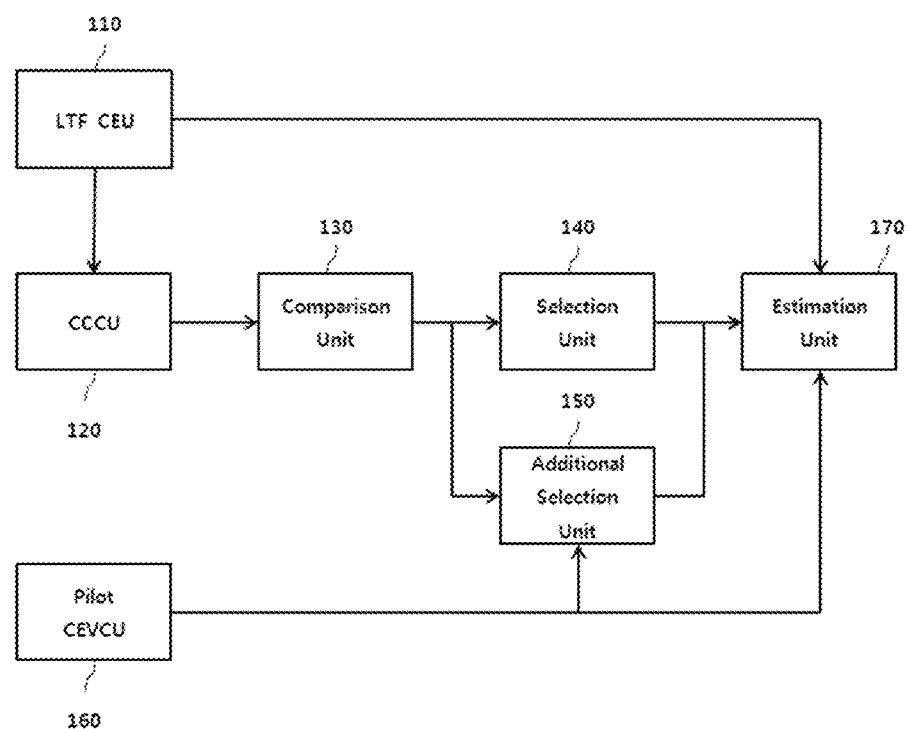
FIG. 1 is a functional block diagram showing a channel estimation apparatus in accordance with the present invention.

FIG. 1 is a functional block diagram showing a channel estimation apparatus in accordance with the present invention.

The channel estimation apparatus in accordance with the present invention will be described hereinafter in more detail with reference to FIG. 1.

When a packet is received through an IEEE 802.11ad wireless communication network, an LTF channel estimation unit (LTF CEU) 110 extracts the Long Training Field (LTF) data stored in the preamble of the received packet and calculates an LTF channel estimation value based on the extracted LTF data. The received packet has a preamble, a header and a data field. The preamble has two fields of a short training field and a long training field, and each of the fields consists of values of −1 and 1. Here, the short training field is used to synchronize timing errors created while the packet passes through a channel and to estimate a carrier frequency offset, and the long training field is used for channel estimation. Here, the long training field consists of a first Golay sequence and a second Golay sequence respectively having 128 values, and the LTF channel estimation unit 110 calculates the LTF channel estimation value from a sum of autocorrelation functions of the first Golay sequence and the second Golay sequence of the received packet.

A correlation coefficient calculation unit (CCCU) 120 calculates a correlation coefficient representing the similarity between the LTF channel estimation value calculated by the LTF channel estimation unit 110 and an ideal LTF channel estimation value free from noise. If the calculated LTF channel estimation value is similar to the ideal LTF channel estimation value, it means that the channel state is not changed and the channel does not have a noise. Preferably, if the correlation coefficient is close to 1, the calculated LTF channel estimation value and the ideal LTF channel estimation value are similar to each other, and if the correlation coefficient is close to 0, the calculated LTF channel estimation value and the ideal LTF channel estimation value are different from each other.

A comparison unit 130 determines a range in which the correlation coefficient exists with respect to a first channel determination value and a second channel determination value by comparing the correlation coefficient with the first channel determination value and the second channel determination value. Here, the first channel determination value is a critical value for determining whether a channel environment is a slow fading channel environment or a fast fading channel environment, and the second channel determination value is a critical value for selecting a pilot channel estimation value as a channel estimation value even in the slow fading channel environment. Here, the second channel determination value is larger than the first channel determination value and may vary depending on the field or channel environment to which the present invention is applied, and this is within the scope of the present invention. The comparison unit 130 determines whether the correlation coefficient exists in a first range smaller than the first channel determination value, a second range larger than the second channel determination value, or a third range between the first channel determination value and the second channel determination value by comparing the correlation coefficient with the first channel determination value and the second channel determination value.

A selection unit 140 selects a channel estimation value used for channel estimation based on whether the correlation coefficient exists in the first range, the second range or the third range. In an embodiment, the selection unit 140 selects the LTF channel estimation value as a channel estimation value used for channel estimation if the correlation coefficient exists in the second or third range and selects the pilot channel estimation value as a channel estimation value used for channel estimation if the correlation coefficient exists in the first range.

In another exemplary embodiment of the present invention, the selection unit 140 selects the LTF channel estimation value as a channel estimation value used for channel estimation if the correlation coefficient exists in the second range and selects the pilot channel estimation value as a channel estimation value used for channel estimation if the correlation coefficient exists in the first range. On the other hand, if the correlation coefficient exists in the third range as a result of the determination of the comparison unit 130, an additional selection unit 150 secondarily selects the LTF channel estimation value as a channel estimation value based on a determination ratio between the LTF channel estimation value and the pilot channel estimation value in a pilot estimation period or secondarily selects the pilot channel estimation value as a channel estimation value used for channel estimation only in a pilot estimation period and adjacent pilot estimation periods. A pilot channel estimation value calculation unit (pilot CEVCU) 160 calculates a pilot channel estimation value only in each pilot estimation period.

An estimation unit 170 performs channel estimation according to the channel estimation value selected by the selection unit 140 or the additional selection unit 150.

Figure 2:
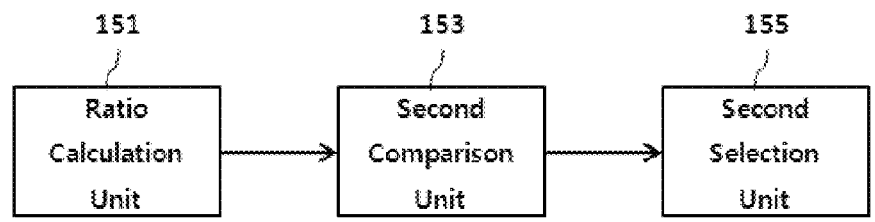
FIG. 2 is a functional block diagram further specifically showing an additional selection unit in accordance with the present invention.

FIG. 2 is a functional block diagram further specifically showing an additional selection unit 150 in accordance with the present invention.

The additional selection unit 150 will be described hereinafter in more detail with reference to FIG. 2.

A ratio calculation unit 151 calculates a determination ratio between the LTF channel estimation value of a pilot estimation period and the pilot channel estimation value of the same pilot estimation period calculated by the pilot channel estimation value calculation unit 160.

A second comparison unit 153 determines whether or not the determination ratio exists within a critical range by comparing the determination ratio calculated by the ratio calculation unit 151 and the critical range. A deep hole, which is an instantaneous and abrupt change of the channel state, may occur in a slow fading channel environment or a fast fading channel environment. Here, the critical range is a value for determining the deep hole, and it is understood that the deep hole does not occur if the determination ratio exists within the critical range. The critical range is a value set depending on the field or channel environment to which the present invention is applied.

When the determination ratio does not exist within the critical range, a second selection unit 155 selects the pilot channel estimation value of the pilot estimation period, pilot channel estimation values of adjacent pilot estimation periods adjacent to the pilot estimation period, and pilot interpolation estimation values calculated by interpolating the pilot channel estimation values of the pilot estimation period and the adjacent pilot estimation periods as channel estimation values. However, if the determination ratio exists within the critical range, the second selection unit 155 selects the LTF channel estimation value as a channel estimation value.

In the present invention, when the correlation coefficient exists within the second range, the channel environment is determined as a slow fading channel environment, and the LTF channel estimation value is used, whereas when the correlation coefficient exists within the first range, the channel environment is determined as a fast fading channel environment, and the pilot channel estimation value is used. Then, when the correlation coefficient exists within the third range, the slow fading channel environment and the fast fading channel environment may coexist. In this case, the pilot interpolation channel estimation values are calculated based on the determination ratio by interpolating only the pilot channel estimation values in the corresponding pilot estimation period and adjacent pilot estimation periods only when a deep hole occurs, i.e., when the determination ratio does not exist within the critical range, and thus the amount of computation can be reduced and a channel may be correctly estimated, compared with the case of calculating the pilot interpolation channel estimation values for all the pilot estimation periods.

Figure 3:
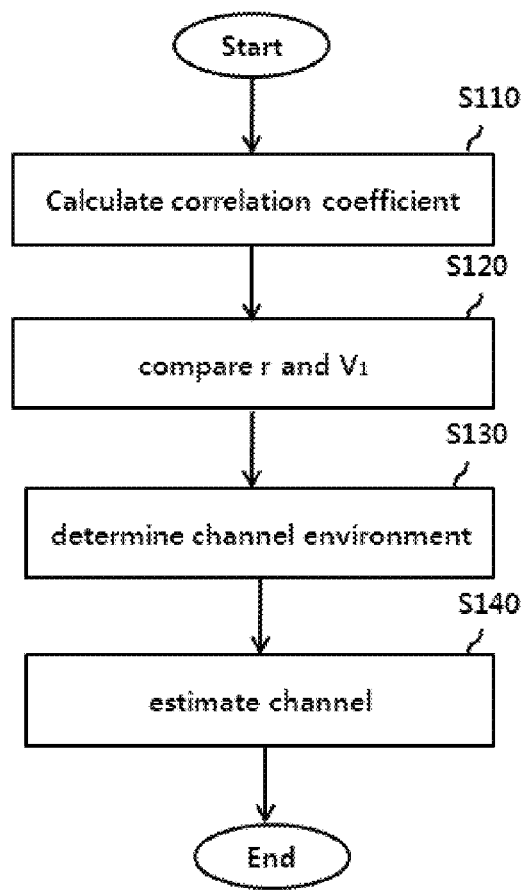
FIG. 3 is a flowchart illustrating a channel estimation method in accordance with the present invention.

FIG. 3 is a flowchart illustrating a channel estimation method in accordance with the present invention.

The channel estimation method in accordance with the present invention will be described hereinafter in more detail with reference to FIG. 3.

An LTF channel estimation value is calculated based on the long training field data stored in the preamble of a packet received through a wireless communication network using the IEEE 802.11ad communication standard, and a correlation coefficient (r) representing the similarity between the calculated LTF channel estimation value and an ideal LTF channel estimation value free from noise is calculated (S110).

The calculated correlation coefficient is compared with a first channel determination value ($V_1$) (S120), and it is determined whether the current communication channel environment is a slow fading channel environment or a fast fading channel environment based on the result of the comparison (S130). Here, the current communication channel environment is determined as a slow fading channel environment if the correlation coefficient is larger than the first channel determination value and as a fast fading channel environment if the correlation coefficient is smaller than the first channel determination value.

The channel is estimated according to the determined channel environment by selecting the LTF channel estimation value if the channel environment is determined as a slow fading channel environment and selecting the pilot channel estimation value if the channel environment is determined as a fast fading channel environment (S140).

Figure 4:
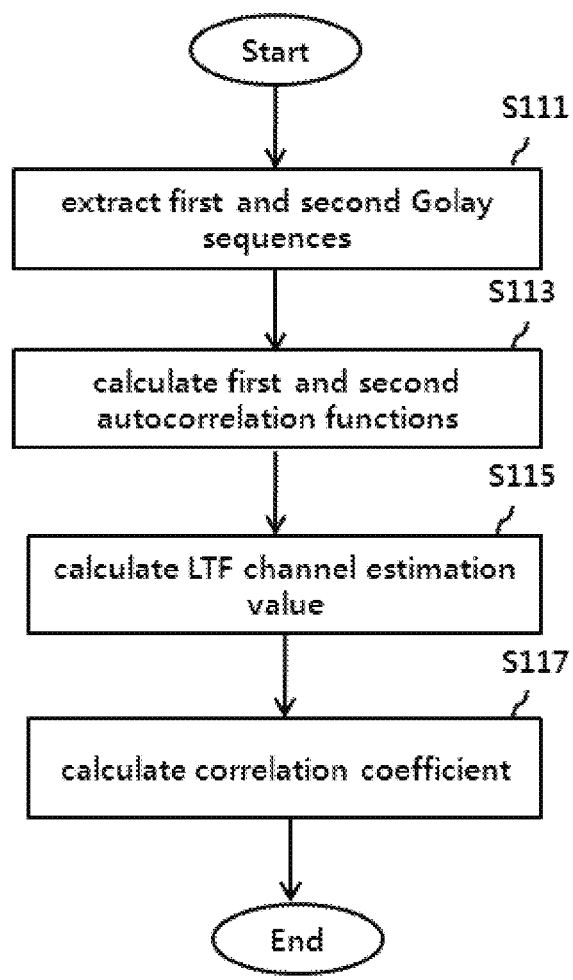
FIG. 4 is a flowchart further specifically illustrating the step of calculating a correlation coefficient in a channel estimation method in accordance with the present invention.

FIG. 4 is a flowchart further specifically illustrating the step of calculating a correlation coefficient in a channel estimation method in accordance with the present invention.

The step of calculating a correlation coefficient in a channel estimation method will be described hereinafter with reference to FIG. 4.

A first Golay sequence $G_a$ and a second Golay sequence $G_b$ stored in the long training field are extracted from the preamble of a received packet (S111). FIG. 5(a) shows a first Golay sequence $G_a$ of the long training field stored in the preamble of the packet, and FIG. 5(b) shows a second Golay sequence $G_b$ of the long training field stored in the preamble of the packet.

A first autocorrelation function $\rho_a(k)$ of the first Golay sequence Ga and a second autocorrelation function $\rho_b(k)$ of the second Golay sequence Gb are calculated by applying the first Golay sequence Ga and the second Golay sequence Gb to the following Equation 1 and the following Equation 2, respectively (S113):

$$\rho_a(k) = \sum_{i=0}^{N-k-1} a_i a_{i+k} \quad 0 \le k \le N-1 \quad \text{[Equation 1]}$$

wherein $a_i$ and $a_{i+k}$ respectively denote an $i^{th}$ first Golay sequence and an $(i+k)^{th}$ first Golay sequence, and N denotes the maximum length of the first Golay sequence. In an exemplary embodiment of the present invention, a first Golay sequence having a length of N=128 is used.

$$\rho_b(k) = \sum_{i=0}^{N-k-1} b_i b_{i+k} \quad 0 \le k \le N-1 \quad \text{[Equation 2]}$$

wherein $b_i$ and $b_{i+k}$ respectively denote an $i^{th}$ second Golay sequence and an $(i+k)^{th}$ second Golay sequence, and N denotes the maximum length of the second Golay sequence. In an exemplary embodiment of the present invention, a second Golay sequence having a length of N=128 is used.

An LTF channel estimation value is calculated from a sum of the first autocorrelation function of the first Golay sequence and the second autocorrelation function of the second Golay sequence (S115). Here, the LTF channel estimation value means a channel impulse response. A correlation coefficient representing the similarity between the calculated LTF channel estimation value and an ideal LTF channel estimation value free from noise is calculated using the following Equation 3 (S117).

$$r = \frac{\sum_{i=1}^{n} (x_i - m_x)(y_i - m_y)}{\left|\sum_{i=1}^{n}(x_i - m_x)\right|\left|\sum_{i=1}^{n}(y_i - m_y)\right|} \quad \text{[Equation 3]}$$

wherein $x_i$ denotes an $i^{th}$ channel impulse response among the calculated LTF channel estimation values, $m_x$ denotes an average value of all the channel impulse responses constituting the calculated LTF channel estimation values, $y_i$ denotes an $i^{th}$ channel impulse response among the ideal LTF channel estimation values, $m_y$ denotes an average value of all the channel impulse responses constituting the ideal LTF channel estimation values, and n denotes the number of channel impulse responses constituting the calculated LTF channel estimation values and the ideal LTF channel estimation values.

The ideal LTF channel estimation value satisfies the following Equation 4.

$$\begin{cases} \rho_a(k) + \rho_b(k) = C\delta(k) & k = 0 \\ \rho_a(k) + \rho_b(k) = 0 & k \ne 0 \end{cases} \quad \text{[Equation 4]}$$

Figure 6:
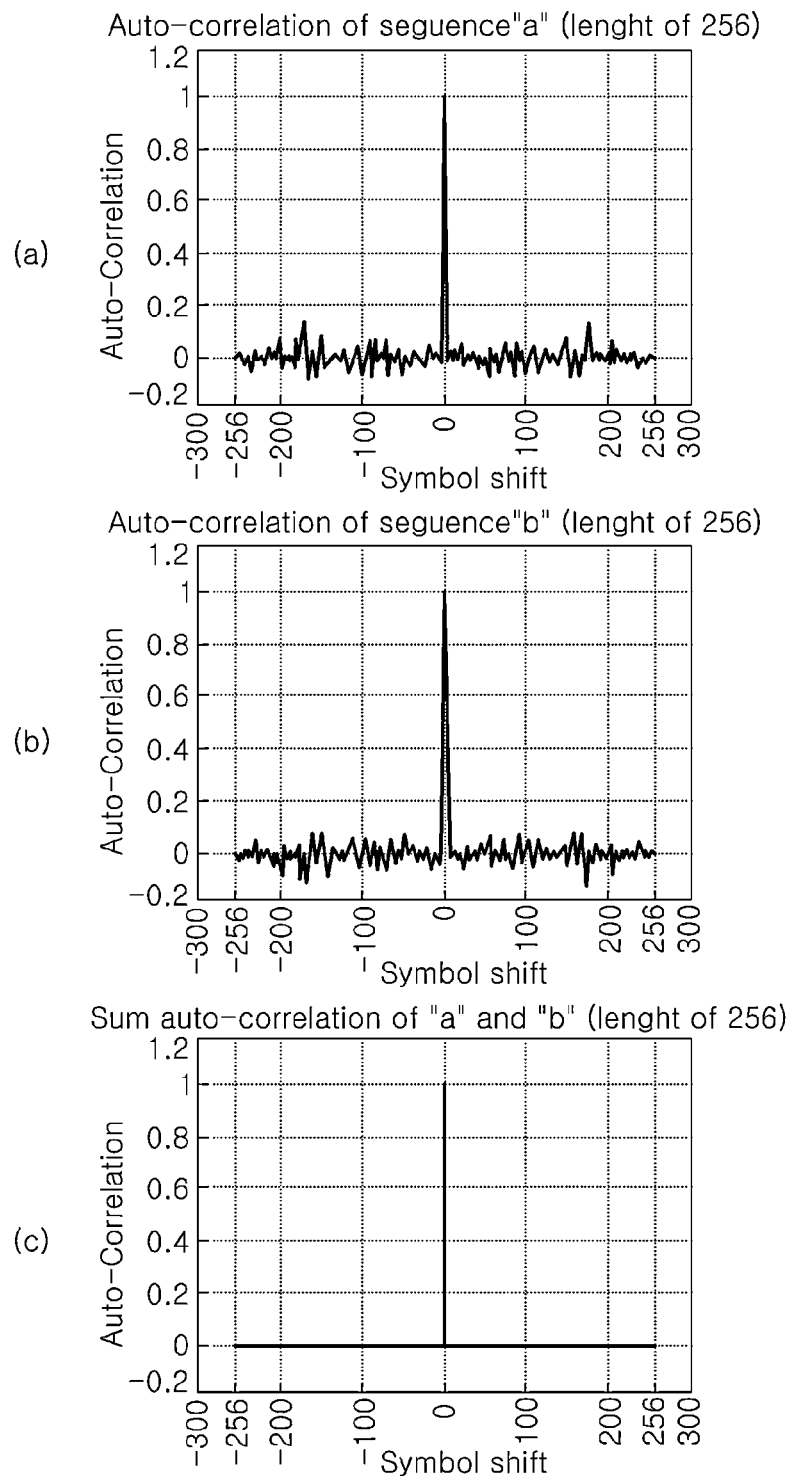
FIG. 6 shows examples of autocorrelation functions in an ideal channel free from noise.

FIG. 6 shows examples of autocorrelation functions in an ideal channel free from noise. FIG. 6(a) shows a first autocorrelation function, FIG. 6(b) shows a second autocorrelation function, and FIG. 6(c) shows an LTF channel estimation value.

Figure 7:
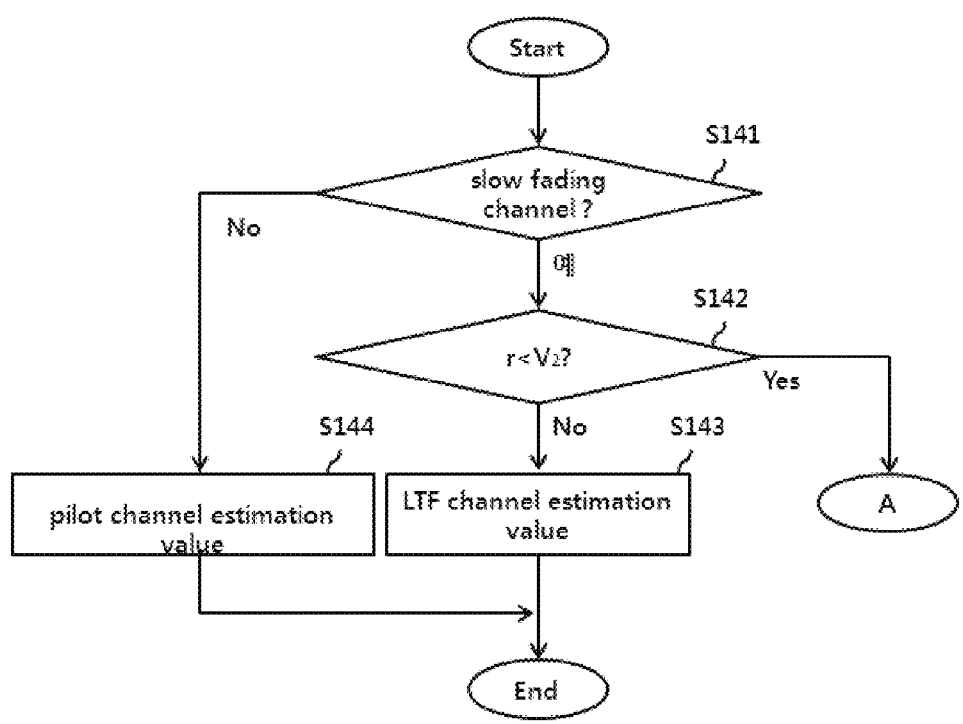
FIGS. 7 and 8 are flowcharts further specifically illustrating the step of selecting a channel estimation value in a channel estimation method in accordance with the present invention.

FIG. 7 is a view further specifically illustrating the step of selecting a channel estimation value in a channel estimation method in accordance with the present invention.

The step of selecting a channel estimation value in a channel estimation method will be described hereinafter in more detail with reference to FIG. 7.

It is determined that whether or not a communication channel environment is a slow fading channel environment (S141), and when the channel environment is determined as a slow fading channel environment, it is determined whether or not the correlation coefficient (r) belongs to a range larger than the first channel determination value ($V_1$) and smaller than the second channel determination value ($V_2$) (S142).

When the correlation coefficient belongs to a range larger than the second channel determination value, the channel is estimated using the LTF channel estimation value (S143). On the other hand, if it is determined that the channel environment is not a slow fading channel environment, i.e., when the correlation coefficient is smaller than the first channel determination value and thus the channel environment is determined as a fast fading channel environment, the channel is estimated using the pilot channel estimation value (S144).

Figure 8:
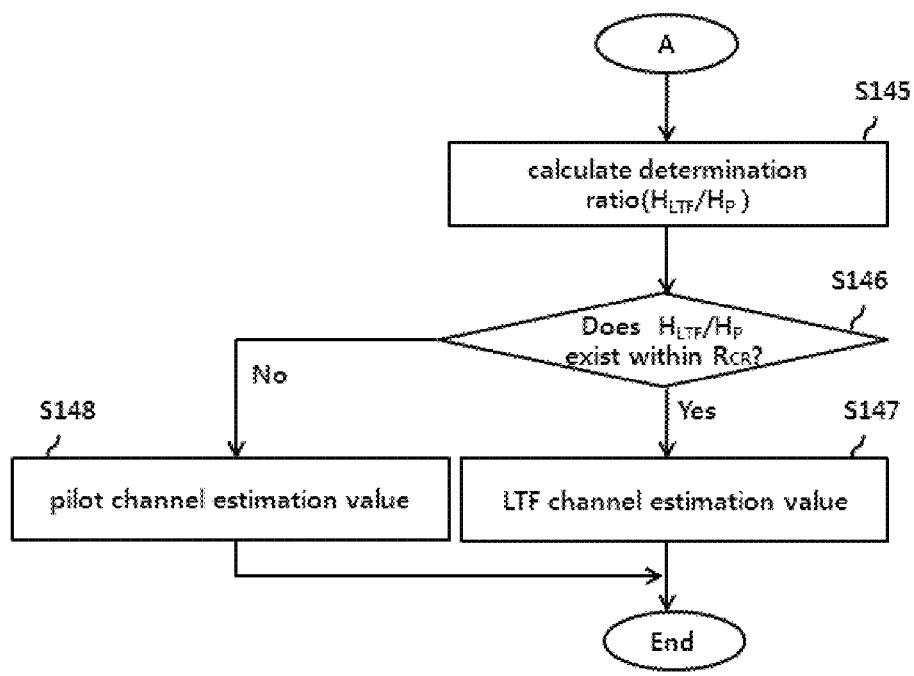

However, if the correlation coefficient belongs to a range larger than the first channel determination value and smaller than the second channel determination value, step A is performed, and describing the step A in more detail with reference to FIG. 8, a determination ratio $H_{LTF}/H_P$ between the LTF channel estimation value $H_{LTF}$ and the pilot channel estimation value $H_P$ is calculated in each pilot estimation period (S145). It is determined whether or not the calculated determination ratio exists within a critical range ($R_{cr}$) (S146), and if the determination ratio does not exist within the critical range, the channel is estimated using pilot channel estimation values and pilot interpolation estimation values of a pilot estimation period and adjacent pilot estimation periods adjacent to the pilot estimation period (S148). The pilot channel estimation value of the pilot estimation period and the pilot channel estimation values of the adjacent pilot estimation periods are assigned as channel estimation values, and pilot interpolation estimation values created by interpolating the pilot channel estimation value of the pilot estimation period and the pilot channel estimation values of the adjacent pilot estimation periods are assigned as channel estimation values between the pilot estimation period and the adjacent pilot estimation periods. On the other hand, if the calculated determination ratio exists within the critical range, the LTF channel estimation value is assigned as a channel estimation value, and the channel is estimated using the LTF channel estimation value (S147).

FIG. 9 is a view showing an example for explaining a method of selecting a channel estimation value when a determination ratio does not exist within a critical range in a channel estimation method in accordance with the present invention.

The example for explaining a method of selecting a channel estimation value will be described hereinafter with reference to FIG. 9.

A determination ratio between the LTF channel estimation value $H_{LTF}$ and the pilot channel estimation value $H_P$ is calculated in each pilot estimation period. If the determination ratio $H_{LTF[3]}/H_{P[1]}$ between the LTF channel estimation value $H_{LTF[3]}$ and the pilot channel estimation value $H_{P[1]}$ does not exist within a critical range in the second pilot channel period, channel estimation values of the corresponding pilot estimation period and the adjacent pilot estimation periods at both sides are assigned as pilot channel estimation values, and pilot interpolation estimation values ($H_{interp}$) created by interpolating the pilot channel estimation value of the pilot estimation period and the pilot channel estimation values of the adjacent pilot estimation periods are assigned as channel estimation values between the pilot estimation period and the adjacent pilot estimation periods. In the present invention, since the pilot interpolation estimation values are calculated by interpolating pilot channel estimation values based on the determination ratio only when a deep hole occurs in a channel environment, the amount of computation can be reduced compared with the case of calculating the pilot interpolation estimation values for all the pilot estimation periods, and a channel can be correctly estimated in a channel environment generating a deep hole.

Figure 10:
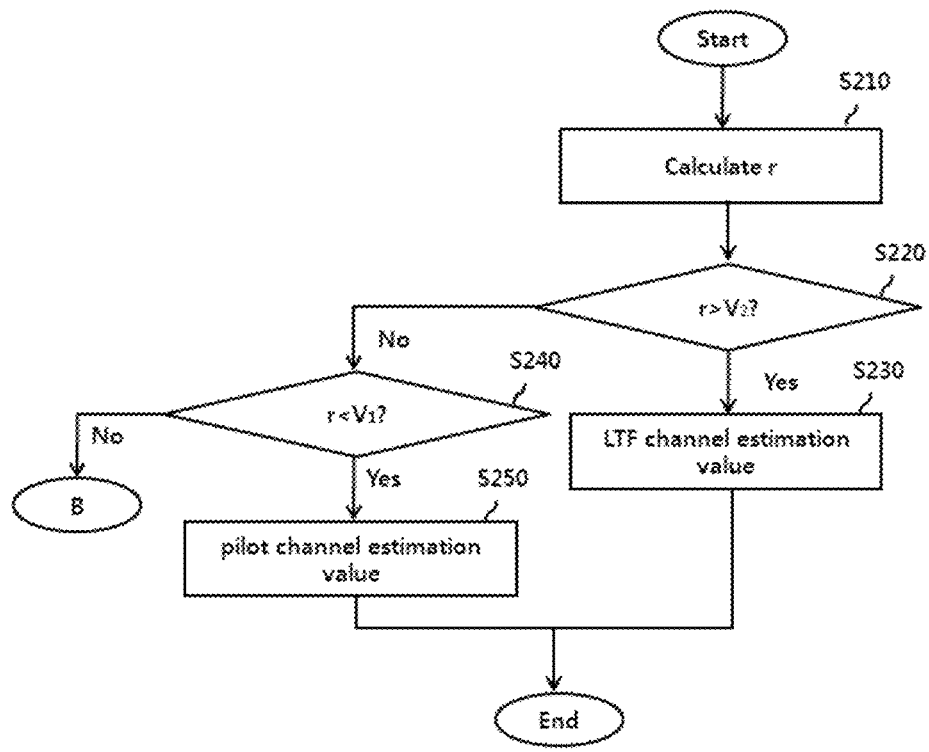
FIGS. 10 and 11 are flowcharts illustrating a channel estimation method in accordance with another exemplary embodiment of the present invention.

FIG. 10 is a flowchart illustrating a channel estimation method in accordance with another exemplary embodiment of the present invention.

In a channel estimation method in accordance with another exemplary embodiment of the present invention described with reference to FIG. 10, configurations the same as those of the channel estimation method in accordance with an exemplary embodiment of the present invention described above will be simplified or omitted for brevity of explanation.

An LTF channel estimation value is calculated by adding autocorrelation functions of the first Golay sequence and the second Golay sequence of the long training field (LTF) stored in the preamble of a packet received through a wireless communication network using the IEEE 802.11ad communication standard, and a correlation coefficient representing the similarity between the calculated LTF channel estimation value and an ideal LTF channel estimation value free from noise is calculated (S210).

It is determined whether or not the correlation coefficient belongs to a second range larger than a second channel determination value by comparing the calculated correlation coefficient with the second channel determination value.

If the correlation coefficient is larger than the second channel determination value and belongs to the second range, the channel is estimated using the LTF channel estimation value (S230). On the other hand, if the correlation coefficient is smaller than the second channel determination value, it is determined whether or not the correlation coefficient is smaller than a first determination value (S240). If the correlation coefficient is smaller than the first determination value and belongs to the first range, the channel is estimated using the pilot channel estimation value (S250). However, if the correlation coefficient is larger than the first channel determination value and smaller than the second channel determination value, step B is performed.

Figure 11:
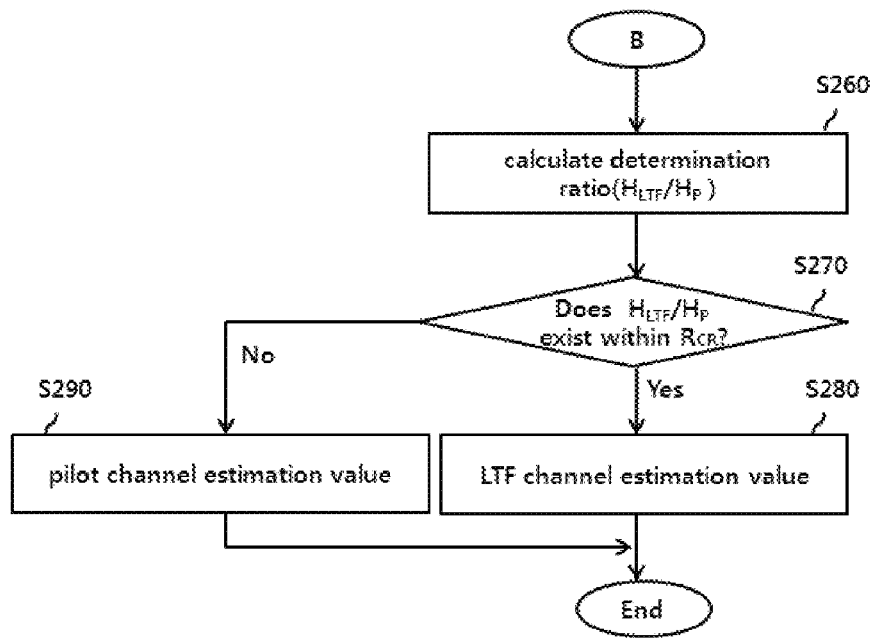

The step B will be described hereinafter in more detail with reference to FIG. 11.

A determination ratio $H_{LTF}/H_P$ between the LTF channel estimation value $H_{LTF}$ and the pilot channel estimation value $H_P$ is calculated in each pilot estimation period (S260). It is determined whether or not the calculated determination ratio exists within a critical range (S270), and if the determination ratio does not exist within the critical range, the channel is estimated using pilot channel estimation values and pilot interpolation estimation values of a pilot estimation period and adjacent pilot estimation periods adjacent to the pilot estimation period (S290). The pilot channel estimation value of the pilot estimation period and the pilot channel estimation values of the adjacent pilot estimation periods are assigned as channel estimation values, and the pilot interpolation estimation values created by interpolating the pilot channel estimation value of the pilot estimation period and the pilot channel estimation values of the adjacent pilot estimation periods are assigned as channel estimation values between the pilot estimation period and the adjacent pilot estimation periods. On the other hand, if the calculated determination ratio exists within the critical range, the LTF channel estimation value is assigned as a channel estimation value, and the channel is estimated using the LTF channel estimation value (S280).

In the channel estimation method in accordance with an exemplary embodiment of the present invention and the channel estimation method in accordance with another exemplary embodiment of the present invention described above, the first channel determination value and the second channel determination value may be set considering the field to which the present invention is applied and channel environment characteristics of a region in which the present invention is used.

Figure 12:
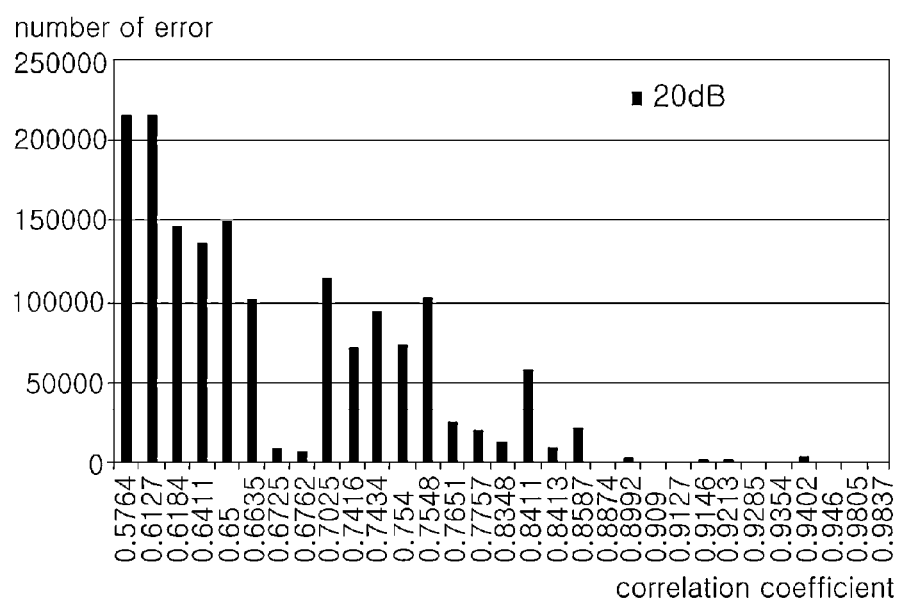
FIG. 12 is a view showing experiment data on the number of errors generated when an LTF channel estimation value is used.

FIG. 12 is a view showing the number of errors generated when an LTF channel estimation value is used, and it may be confirmed that if the signal-to-noise ratio (SNR) is 20 dB and the correlation coefficient is 0.95 or higher, the number of data errors is almost zero. On the other hand, it may be confirmed that if the correlation coefficient is 0.80 or lower and an LTF channel estimation value is used, the number of packet errors is 20,000 or more. Accordingly, it is preferable that the first channel determination value is set to 0.80 and the second channel determination value is set to 0.95.

As described above, the channel estimation method in accordance with the present invention in a wireless communication network of the IEEE 802.11ad communication standard has the following various effects as compared to a conventional estimation method.

First, since a channel estimation scheme is selected according to a channel environment, the channel estimation method in accordance with the present invention can actively determine the channel estimation scheme according to a channel environment, unlike the conventional channel estimation method using a fixed channel estimation scheme.

Second, the channel estimation method in accordance with the present invention determines a channel environment according to a correlation coefficient representing a similarity between an LTF channel estimation value of a packet received from a wireless communication network of the IEEE 802.3 as communication standard and an ideal LTF channel estimation value free from noise and applies a channel estimation scheme appropriate for the determined channel environment, so that the inventive channel estimation method can estimate a channel with a small amount of computation as compared to a pilot-based channel estimation scheme and estimate the channel more correctly as compared to an LTF-based channel estimation scheme.

Third, the channel estimation method in accordance with the present invention selectively applies a pilot channel estimation scheme even in a slow fading channel environment, so that it can correctly estimate a channel with a small amount of computation by a combination of the LTF-based channel estimation scheme and the pilot-based channel estimation scheme.

Meanwhile, the embodiments of the present invention as described above can be constructed by a computer program that can be executed in a computer and can be implemented in a general-purpose digital computer that operates the program using a computer-readable recording medium. The computer-readable recording media include storage media such as magnetic storage media (e.g., ROM, floppy disk, hard disk and the like), optical media (e.g., CD, DVD and the like), and carrier waves (e.g., transmission through the Internet).

While the present invention has been described in connection with the exemplary embodiments illustrated in the drawings, they are merely illustrative and the invention is not limited to these embodiments. It will be appreciated by a person having an ordinary skill in the art that various equivalent modifications and variations of the embodiments can be made without departing from the spirit and scope of the present invention. Therefore, the true technical scope of the present invention should be defined by the technical spirit of the appended claims.

What is claimed is:

1. A method of estimating a channel in a wireless communication network, the method comprising the steps of:
calculating a correlation coefficient representing a similarity between
a long training field (LTF) channel estimation value calculated based on LTF data stored in a preamble of a received packet and
an ideal noise-free LTF channel estimation value;
comparing the correlation coefficient with a first channel determination value;
determining either a slow fading channel environment or a fast fading channel environment, as a channel environment based on a result of the comparison;
when the channel environment is determined as the fast fading channel environment, estimating the channel using a pilot channel estimation value in a pilot estimation period; and
when the channel environment is determined as the slow fading channel environment,
determining whether or not the correlation coefficient belongs to a range larger than the first channel determination value and smaller than a second channel determination value;
calculating, when the correlation coefficient belongs to the range, a determination ratio between the LTF channel estimation value and the pilot channel estimation value;
determining whether or not the determination ratio is within a critical range; and
estimating, when the determination ratio is out of the critical range, the channel by using the pilot channel estimation value, adjacent pilot channel estimation values in adjacent pilot estimation periods adjacent to the pilot estimation period, and pilot interpolation estimation values interpolated from the pilot channel estimation value and the adjacent pilot channel estimation values.

2. The method according to claim 1, wherein the wireless communication network conforms to Institute of Electrical and Electronics Engineers (IEEE) 802.11ad communication standard.

3. The method according to claim 2, wherein the step of calculating the correlation coefficient comprises the steps of:
extracting a first Golay sequence and a second Golay sequence from the LTF data stored in the preamble of the received packet;
performing autocorrelation functions of the first Golay sequence and the second Golay sequence;
calculating the LTF channel estimation value from a sum of the autocorrelation functions; and
calculating the correlation coefficient representing the similarity between the LTF channel estimation value and the ideal noise-free LTF channel estimation value.

4. The method according to claim 1,
wherein the pilot channel estimation value of the pilot estimation period and the adjacent pilot channel estimation values of the adjacent pilot estimation periods are assigned as channel estimation values, and
wherein the pilot interpolation estimation values created by interpolating the pilot channel estimation value of the pilot estimation period and the adjacent pilot channel estimation values of the adjacent pilot estimation periods are assigned as channel estimation values between the pilot estimation period and the adjacent pilot estimation periods.

5. The method according to claim 1, further comprising:
estimating, when the determination ratio is within the critical range, the channel using the LTF channel estimation value.

6. The method according to claim 1, wherein the correlation coefficient (r) is calculated using the following Equation 1:

$$r = \frac{\sum_{i=1}^{n}(x_i - m_x)(y_i - m_y)}{\left|\sum_{i=1}^{n}(x_i - m_x)\right|\left|\sum_{i=1}^{n}(y_i - m_y)\right|}$$ [Equation 1]

wherein $x_i$ denotes an $i^{th}$ channel impulse response among the calculated LTF channel estimation values, $m_x$ denotes an average value of all the channel impulse responses constituting the calculated LTF channel estimation values, $y_i$ denotes an $i^{th}$ channel impulse response among the ideal noise-free LTF channel estimation values, $m_y$ denotes an average value of all the channel impulse responses constituting the ideal noise-free LTF channel estimation values, and n denotes the number of channel impulse responses constituting the calculated LTF channel estimation values and the ideal noise-free LTF channel estimation values.

7. The method according to claim 1, wherein the first channel determination value is 0.8.

8. The method according to claim 1, wherein the second channel determination value is 0.95.

9. A method of estimating a channel in a wireless communication network, the method comprising the steps of:
calculating a correlation coefficient representing a similarity between
a long training field (LTF) channel estimation value estimated based on LTF data stored in a preamble of a received packet and
an ideal noise-free LTF channel estimation value;
determining a range of the correlation coefficient with respect to a first channel determination value and a second channel determination value, by comparing the correlation coefficient with the first channel determination value and the second channel determination value; and
when the correlation coefficient belongs to a range between larger than the first channel determination value and smaller than the second channel determination value,
calculating a determination ratio between the LTF channel estimation value and a pilot channel estimation value in a pilot estimation period;
determining whether or not the determination ratio exists within a critical range; and
estimating, when the determination ratio is out of the critical range, the channel using the pilot channel estimation value, adjacent pilot channel estimation values in adjacent pilot estimation periods adjacent to the pilot estimation period, and pilot interpolation estimation values interpolated from the pilot channel estimation value and the adjacent pilot channel estimation values.

10. The method according to claim 9, wherein the wireless communication network conforms to Institute of Electrical and Electronics Engineers (IEEE) 802.11ad communication standard.

11. The method according to claim 10, wherein the step of calculating the correlation coefficient comprises the steps of:
extracting a first Golay sequence and a second Golay sequence from the LTE data stored in the preamble of the received packet;
performing autocorrelation functions of the first Golay sequence and the second Golay sequence;
calculating the LTF channel estimation value from a sum of the autocorrelation functions; and
calculating the correlation coefficient representing the similarity between the LTF channel estimation value and the ideal noise-free LTF channel estimation value.

12. The method according to claim 11, further comprising:
estimating, when the correlation coefficient is smaller than the first channel determination value, the channel using the pilot channel estimation value, and
estimating, when the correlation coefficient is larger than the second channel determination value, the channel using the LTF channel estimation value.

13. The method according to claim 9,
wherein the pilot channel estimation value of the pilot estimation period and the adjacent pilot channel estimation values of the adjacent pilot estimation periods are assigned as channel estimation values, and
wherein the pilot interpolation estimation values created by interpolating the pilot channel estimation value of the pilot estimation period and the adjacent pilot channel estimation values of the adjacent pilot estimation periods are assigned as channel estimation values between the pilot estimation period and the adjacent pilot estimation periods.

14. The method according to claim 13, further comprising:
estimating, when the determination ratio is within the critical range, the channel using the LTF channel estimation value.

15. The method according to claim 9, wherein the correlation coefficient (r) is calculated using the following Equation 2:

$$r = \frac{\sum_{i=1}^{n}(x_i - m_x)(y_i - m_y)}{\left|\sum_{i=1}^{n}(x_i - m_x)\right|\left|\sum_{i=1}^{n}(y_i - m_y)\right|}$$ [Equation 2]

wherein $x_i$ denotes an $i^{th}$ channel impulse response among the calculated LTF channel estimation values, $m_x$ denotes an average value of all the channel impulse responses constituting the calculated LTF channel estimation values, $y_i$ denotes an $i^{th}$ channel impulse response among the ideal noise-free LTF channel estimation values, $m_y$ denotes an average value of all the channel impulse responses constituting the ideal noise-free LTF channel estimation values, and n denotes the number of channel impulse responses constituting the calculated LTF channel estimation values and the ideal noise-free LTF channel estimation values.

16. An apparatus for estimating a channel in a wireless data communication network, the apparatus comprising:
a long training field (LTF) channel estimation value calculation unit configured to calculate an LTF channel estimation value estimated based on LTF data stored in a preamble of a received packet;
a correlation coefficient calculation unit configured to calculate a correlation coefficient representing a similarity between the LTF channel estimation value and an ideal noise-free LTF channel estimation value;
a comparison unit configured to determine a range of the correlation coefficient existing with respect to a first channel determination value and a second channel determination value by comparing the correlation coefficient with the first channel determination value and the second channel determination value;
a selection unit configured to select a channel estimation value used for estimating the channel based on the range in which the correlation coefficient exists;
an additional selection unit configured to secondarily select a channel estimation value based on a determination ratio between the LTF channel estimation value and a pilot channel estimation value in a pilot estimation period, when the correlation coefficient belongs to a range between larger than the first channel determination value and smaller than the second channel determination value; and
a channel estimation unit configured to estimate the channel according to the selected channel estimation value.

17. The apparatus according to claim 16, wherein the wireless communication network conforms to Institute of Electrical and Electronics Engineers (IEEE) 802.11ad communication standard.

18. The apparatus according to claim 17, wherein the LTF channel estimation value calculation unit configured to calculate the LTF channel estimation value from a sum of autocorrelation functions of a first Golay sequence and a second Golay sequence stored in the preamble of the received packet.

19. The apparatus according to claim 18, wherein the selection unit configured to select the pilot channel estimation value as the channel estimation value when the correlation coefficient is smaller than the first channel determination value, and the LTF channel estimation value as the channel estimation value when the correlation coefficient is larger than the second channel determination value.

20. The apparatus according to claim 16, wherein the additional selection unit comprises:
a ratio calculation unit configured to calculate the determination ratio between the LTF channel estimation value and the pilot channel estimation value in the pilot estimation period;
a second comparison unit configured to determine whether or not the determination ratio is within a critical range by comparing the determination ratio with the critical range;
an interpolation unit configured to calculate pilot interpolation estimation values from the pilot channel estimation value and adjacent pilot estimation values of adjacent pilot estimation periods adjacent to the pilot estimation period, when the determination ratio is out of the critical range; and
a second selection unit configured to select the pilot channel estimation value, the adjacent pilot channel estimation values, and the interpolation estimation values, as the channel estimation values.

21. The apparatus according to claim 20, wherein the additional selection unit estimates the channel using the LTF channel estimation value when the determination ratio is within the critical range.

22. The apparatus according to claim 16, wherein the correlation coefficient (r) is calculated using the following Equation 3:

$$r = \frac{\sum_{i=1}^{n}(x_i - m_x)(y_i - m_y)}{\left|\sum_{i=1}^{n}(x_i - m_x)\right|\left|\sum_{i=1}^{n}(y_i - m_y)\right|} \quad \text{[Equation 3]}$$

wherein $x_i$ denotes an $i^{th}$ channel impulse response among the calculated LTF channel estimation values, $m_x$ denotes an average value of all the channel impulse responses constituting the calculated LTF channel estimation values, $y_i$ denotes an $i^{th}$ channel impulse response among the ideal noise-free LTF channel estimation values, $m_y$ denotes an average value of all the channel impulse responses constituting the ideal noise-free LTF channel estimation values, and n denotes the number of channel impulse responses constituting the calculated LTF channel estimation values and the ideal noise-free LTF channel estimation values.

\* \* \* \* \*